(12) United States Patent  
Spielberg

(10) Patent No.: US 7,409,149 B2
(45) Date of Patent: Aug. 5, 2008

(54) METHODS FOR IMPROVED AUTOFOCUS IN DIGITAL IMAGING SYSTEMS

(75) Inventor: Anthony C. Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 11/266,668

(22) Filed: Nov. 3, 2005

(65) Prior Publication Data

US 2007/0098380 A1     May 3, 2007

(51) Int. Cl.
*G03B 17/00*     (2006.01)
(52) U.S. Cl. .......................................... 396/50; 396/89
(58) Field of Classification Search ................... 396/50, 396/52–55, 89
See application file for complete search history.

(56) References Cited

U.S. PATENT DOCUMENTS

| | | | |
|---|---|---|---|
| 5,677,760 A * | 10/1997 | Mikami et al. ............. | 356/3.04 |
| 5,764,291 A | 6/1998 | Fullam | |
| 5,900,909 A | 5/1999 | Parulski et al. | |
| 6,148,149 A | 11/2000 | Kagle | |
| 6,222,584 B1 | 4/2001 | Pan | |
| 6,262,769 B1 * | 7/2001 | Anderson et al. ......... | 348/333.1 |
| 6,738,095 B2 | 5/2004 | Dibella et al. | |
| 6,747,690 B2 | 6/2004 | Mølgaard | |
| 6,965,397 B1 * | 11/2005 | Honey et al. ............. | 348/208.2 |
| 2004/0017506 A1 | 1/2004 | Livingston | |

* cited by examiner

*Primary Examiner*—Marvin M. Lateef
*Assistant Examiner*—Minh Q Phan
(74) *Attorney, Agent, or Firm*—Gregory M. Doudnikoff; Schubert Osterrieder Nickelson PLLC

(57) ABSTRACT

Methods to improve autofocus in digital imaging systems, such as digital cameras, are disclosed. Embodiments may include, in response to locking of lens focus on a subject image, determining an initial subject focus distance and an initial attitude, and in response to a request for an exposure, determining a final attitude. Embodiments may also include determining a final target subject distance based on the initial subject focus distance and a focus correction distance, where the focus correction distance is based on the difference between the initial attitude and the final attitude. Embodiments may also include focusing the lens at the final target subject distance. Further embodiments may include after focusing the lens at the final target subject distance, exposing an image. Other embodiments may include determining the initial and final attitude with a micro-electro-mechanical (MEMS)-based sensor or other sensor.

7 Claims, 4 Drawing Sheets

METHODS FOR IMPROVED AUTOFOCUS IN DIGITAL IMAGING SYSTEMS

FIELD OF INVENTION

The present invention is in the field of digital imaging systems and, in particular, to systems and methods for improved autofocus in digital imaging systems such as digital cameras.

BACKGROUND

Digital imaging systems such as digital cameras continue to increase in popularity, providing users with the ability to capture images (i.e., take photographs) with relative ease. Digital imaging systems typically include a lens for directing the light comprising a digital image through a light path to an optical sensor array. Autofocus systems (as well as other automations such as automatic exposure or flash) are often an important part of digital imaging systems as they improve the user experience by making such systems easier to use. Whether an object in an image is 'in focus' (i.e., at the sharpest possible setting) for a digital imaging system depends on a number of factors, including the distance between the lens and the sensor array, the lens focal length, exposure aperture, and the distance to the subject. As subject distance can effect whether an object is in focus, some objects in an image may be 'in focus' while other objects may be 'out of focus'. Autofocus systems typically include a focusing motor that moves a portion of the lens of the digital imaging system in and out until the sharpest possible image of the desired subject is projected onto the optical sensor array. In manual focus systems, a user would turn a focusing ring on the lens until the image (or portion of an image) in the viewfinder appeared in focus.

Autofocus systems typically rely on active autofocus, passive autofocus, or a combination of the two, and utilize one or more autofocus sensors within the field of view. Active autofocus systems measure the distance to the subject (using, for example, sound or infrared signals) and adjust focus of the optical system accordingly. Passive systems analyze the incoming image itself and drive the lens back and forth searching for the best focus and can include both phase detection systems and contrast measurement systems. Complicated autofocus systems with many sensors can add significant cost and complexity to a digital imaging system, as autofocus sensors are relatively expensive and more accurate sensors (e.g., horizontal and vertical capability) are more expensive still. In all but the most expensive digital single-lens-reflex (DSLR) camera, there will typically be only a few autofocus sensors within the user's field of view. Because autofocus sensors do not completely cover the field of view, the subject that the user desires to be in focus may not lie beneath an autofocus sensor, making it difficult to focus on the subject. In this case, users typically rotate the camera until an autofocus point (typically the center autofocus sensor, as it is usually the most accurate) falls over the area of interest and then lock the focus. After locking the focus, the user then may recompose with the subject at the desired location in the frame and then take the exposure.

The solution of locking the autofocus and recomposing often provides unacceptable results, however, when the depth-of-focus (DOF) is small compared to the difference in subject distance between the scene composed as desired as the scene composed during focus lock. A user taking a portrait (where a very small DOF created by large apertures is often aesthetically desirable), for example, might lock focus on the subject's eyes but when the user recomposes, the plane of focus would be behind the eyes. Thus, if the DOF is too small the subject's eyes become out-of-focus and an undesirable photograph results. The DOF may vary depending on imaging sensor size, imaging lens focal length, exposure aperture, and subject distance. For close subject distances and/or large exposure apertures with small DOF, the problem is exacerbated and unacceptable focus shifts are introduced. There is, therefore, a need for an effective system to provide improved autofocus for digital imaging systems.

SUMMARY OF THE INVENTION

The problems identified above are in large part addressed by the disclosed systems and methods for improved autofocus in digital imaging systems. Embodiments may include, in response to locking of lens focus on a subject image, determining an initial subject focus distance and an initial attitude, and in response to a request for an exposure, determining a final attitude. Embodiments may also include determining a final target subject distance based on the initial subject focus distance and a focus correction distance, where the focus correction distance is based on the difference between the initial attitude and the final attitude. Embodiments may also include focusing the lens at the final target subject distance. Further embodiments may include after focusing the lens at the final target subject distance, exposing an image.

A further embodiment provides a digital imaging system having a user interface module to receive focus lock commands and exposure commands from a user and an image capture module to generate a digital image. The system may also include an autofocus system module to automatically focus a lens, where the autofocus system module has a primary autofocus system to determine whether a lens is in focus. The autofocus system module may also have an attitude sensor interface to receive an indication of an initial attitude in response to a focus lock command and a final attitude in response to an exposure command. The autofocus system module may further include an autofocus correction module to determine a focus correction distance based on the initial attitude and the final attitude, where the primary autofocus system corrects lens focus based on the focus correction distance before an exposure is made.

A further embodiment provides a digital imaging system having a housing, a processor within the housing to control operation of the digital imaging system, an autofocus system, and an optical sensor array within the housing and in communication with the processor, where the optical sensor array generates an image in response to light. The system further may include an attitude sensor to determine an initial attitude in response to a focus lock command and a final attitude in response to a shutter release command. The processor of the system may determine a focus correction distance based on difference between the initial attitude and the final attitude and may modify focus based on the focus correction distance. In a further embodiment, the attitude sensor may be a microelectro-mechanical (MEMS)-based sensor.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

Figure 1:
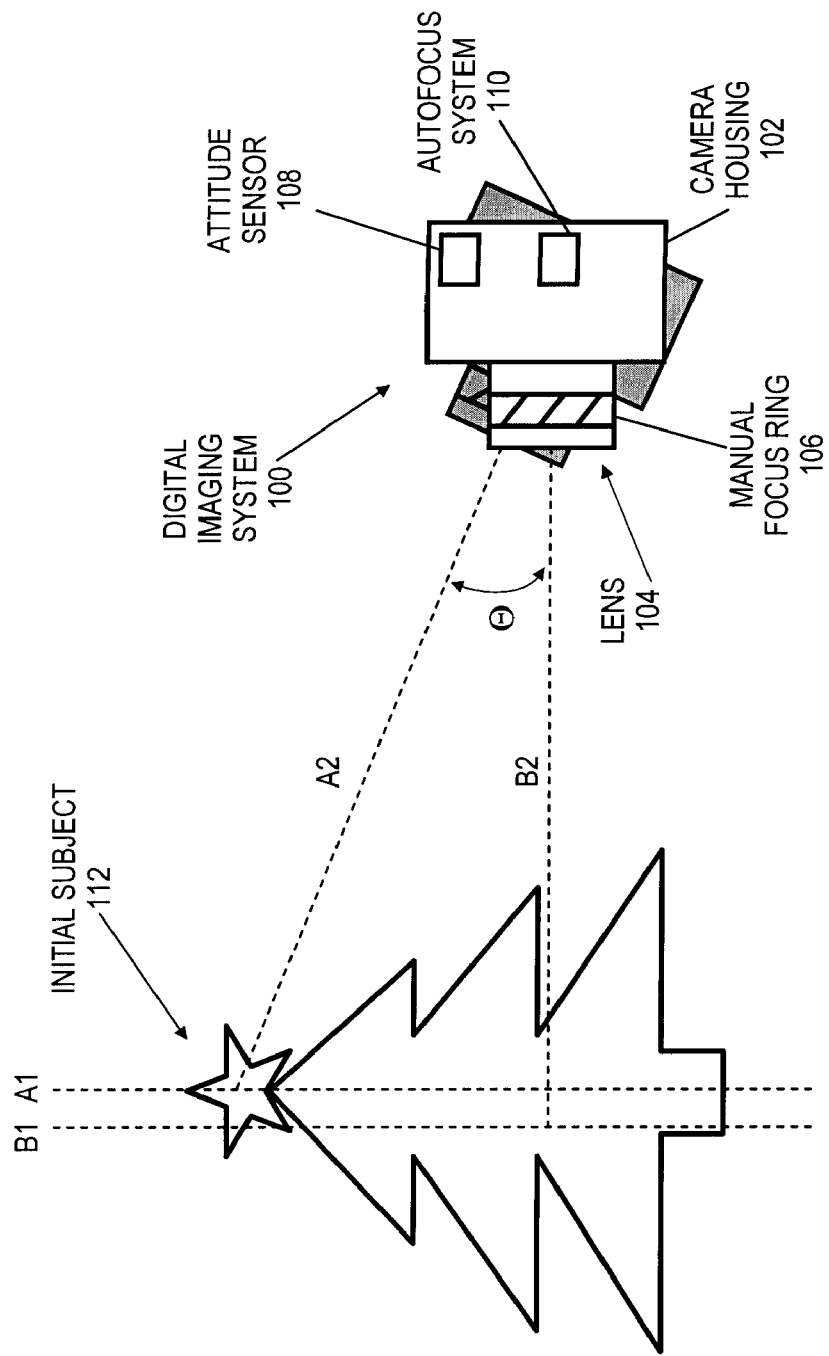
FIG. 1 depicts an environment for a digital imaging system with an autofocus system and an attitude sensor according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems and methods to improve autofocus in digital imaging systems, such as digital cameras, are disclosed. Embodiments may include, in response to locking of lens focus on a subject image, determining an initial subject focus distance and an initial attitude, and in response to a request for an exposure, determining a final attitude. Attitude, as described in more detail subsequently, may represent the orientation in space of an object with respect to defined axes. Embodiments may also include determining a final target subject distance based on the initial subject focus distance and a focus correction distance, where the focus correction distance is based on the difference between the initial attitude and the final attitude. Embodiments may also include focusing the lens at the final target subject distance. Further embodiments may include after focusing the lens at the final target subject distance, exposing an image. Other embodiments may include determining the initial and final attitude with a micro-electro-mechanical (MEMS)-based sensor or other sensor.

The system and methodology of the disclosed embodiments provides an improved method of determining autofocus of a digital imaging system such as a digital camera. Using a sensor such as a MEMS-based sensor, the system may determine an initial attitude when a user selects focus lock and a final attitude after a user recomposes an image and attempts to take an exposure. The attitude of an object may represent its orientation in space comprising the yaw, pitch, and roll of that object with respect to defined axes. The change in attitude of an object may represent its combined angular rotation in yaw, pitch, and roll with respect to defined axes. The disclosed system may advantageously provide a correction to the autofocus based on the difference between the initial attitude and the final attitude (i.e., the change in attitude) to correct for a change in distance resulting from rotation of the digital imaging system. A user focusing on one part of an image, such as an important object like a portrait subject's eyes, may select focus lock and recompose the image. Previous systems resulted in the potential for the initial subject to be out of focus after recomposition because in the change of distance resulting from rotation of the imaging system. The disclosed system advantageously provides for a corrected focus distance so that the initial subject (i.e., the subject's eyes) will be in focus. The disclosed system may be particularly useful where the depth-of-focus is small or shallow, such as with large apertures.

While specific embodiments will be described below with reference to particular configurations of hardware and/or software, those of skill in the art will realize that embodiments of the present invention may advantageously be implemented with other substantially equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Turning now to the drawings, FIG. 1 depicts an environment for a digital imaging system with an autofocus system and an attitude sensor according to one embodiment. In the depicted embodiment, the digital imaging system 100 includes a camera housing 102, a lens 104 with an optional manual focus ring 106, an attitude sensor 108, and an autofocus system 110. The digital imaging system 100 of the depicted embodiment is pointing towards an initial subject 112. The digital imaging system 100 may in some embodiments be a digital camera such as a digital single-lens-reflex (DSLR) (either fixed-lens DSLR or interchangeable-lens DSLR), digital rangefinder camera, digital point-and-shoot (P&S) camera, or fixed-lens digital camera. The digital imaging system 100 may alternatively be an imaging device integrated with another system, such as a mobile phone, personal digital assistant (PDA), wearable device, or mobile computer. In another alternative embodiment, the digital imaging system 100 may be a digital camcorder, digital video camera, or other digital video-recording device.

A user may point the digital imaging system 100 in the direction of a subject in order to take a picture of that subject. To take a picture, light enters through lens 104 and is directed through a light path until it strikes an optical sensor array (described in relation to FIG. 2), whereupon the optical sensor array captures the image. Some digital imaging systems 100 have a single lens while others may have separate lenses for composition and taking. For example, in a DSLR digital imaging system 100 a single lens 104 is used for both viewing an object of interest and for capturing and directing light towards the optical sensor array. Any lenses 104 may also be permanently attached to the camera housing 102 (such as in the case of P&S camera) or may be detachable and interchangeable (such as in the case of interchangeable-lens DSLRs). Lens 104 may also include a manual focus ring 106 to provide an alternative to the autofocus system 110 of the digital imaging system 100 or to provide fine tuning of the focus.

As described previously, whether an object in an image is 'in-focus' (i.e., at the sharpest possible setting) depends on a number of factors, including the distance between the lens 104 and the optical sensor array, the lens focal length, exposure aperture, and the distance to the subject. As subject distance can affect whether an object is in focus, some objects in an image may be in focus while other objects may be out of focus. Autofocus systems 110 typically include a focusing motor that moves a portion of the lens 104 of the digital imaging system 100 in and out until the sharpest possible image of the desired subject is projected onto the optical sensor array. Autofocus systems 110 rely on one or more autofocus sensors within the user's field of view in order to determine whether or not objects 'under' the sensors are in focus. Autofocus systems 110 often determine a distance to the subject as part of their internal algorithms.

The digital imaging system 100 may also include one or more attitude sensors 108, which may be located within camera housing 102 in some embodiments. An attitude sensor 108 may determine the attitude of the digital imaging system 100 with respect to defined yaw, pitch, and roll axes. In some embodiments, the attitude sensor 108 may be a micro-electromechanical (MEMS)-based attitude sensor which measures the orientation of the digital imaging system 100 with respect to the earth's gravimetric field to determine the digital imaging system's 100 three-dimensional attitude in space. MEMS-based attitude sensors may provide a relatively low-cost, reliable, and compact methodology of determining rotational position when compared to other sensors. Many existing digital cameras include a MEMS-based orientation sensor or other orientation sensor to determine whether a photograph was taken in a landscape mode (i.e., horizontal) or portrait mode (i.e., vertical). In some embodiments, these existing orientation sensors are insufficient for a digital imaging system 100 according to the present invention. Existing orientation sensors, for example, are limited to measuring rotation of the camera about an axis parallel to the lens so that a determination may be made with respect to landscape or portrait orientation. Moreover, existing orientation sensors may not have the accuracy required of the disclosed embodiments as they only require accuracy sufficient to distinguish between landscape and portrait modes. In other embodiments, however, attitude sensor 108 may also have the capability of distinguishing landscape and portrait modes, eliminating the need for two sensors. In another alternative embodiment, the attitude sensor 108 may be another type of sensor capable of detecting three-dimensional attitude in space, such as a gyroscope or inertial measurement unit (IMU).

The autofocus system 110 may utilize active autofocus, passive autofocus, or a combination of the two. Active autofocus systems measure the distance to the subject (using, for example, sound or infrared signals) and adjust focus of the optical system accordingly. Passive systems analyze the incoming image itself and drive the lens 104 back and forth searching for the best focus. Passive autofocus systems can include both phase detection systems and contrast measurement systems. Phase detection autofocus systems divide the incoming light to particular autofocus sensors into pairs of images and then compare the resulting images to determine the proper focus. Some contrast-based passive autofocus systems utilize an autofocus sensor such as a charge-coupled device (CCD) that provides input to algorithms to compute the contrast of the actual image elements. A CCD sensor typically has a group of pixels and an on-board processor analyzes the light hitting the sensor by looking at the difference in intensity among the adjacent pixels. As an out-of-focus scene has adjacent pixels with similar intensities, the processor may move the lens 104 and attempt to find the maximum intensity difference between adjacent pixels. The point of maximum intensity difference between pixels is then the point of best focus. Autofocus systems may use a combination of different autofocus sensors and methods, such as a camera that utilizes a passive phase detection system with an autofocus 'assist' from an active autofocus system. In some embodiments, the autofocus sensor 110 may determine distance to the subject as part of its determination of proper focus.

In previous systems, locking focus on one subject and then recomposing could result in undesirable focusing errors in certain situations. For example, a user may point the lens 104 of the digital imaging system 100 at an initial subject 112 such as a Christmas tree with a star on top as depicted in FIG. 1. The user may wish to center their focus (but not their composition) on the star of the tree, pointing the lens 104 of the digital camera system 100 along the line 'A2' as depicted in FIG. 1. Once the star is 'underneath' an autofocus sensor, the autofocus system 110 of the digital imaging system 100 may then automatically focus on the star. The user may then actuate focus lock by, for example, partially depressing the shutter-release button or actuating a focus lock button on the outside of the camera housing 102 to lock the lens focus in its current position. By doing so, the user is attempting to place the center of the plane of focus along line 'A1' of FIG. 1, centered on the star. The user may then recompose their image by rotating the digital imaging system 100 and pointing the lens 104 along line 'B2' as depicted in FIG. 1 while the lens focus remains locked, and then taking the photograph once recomposition is complete. The plane of focus for the lens 104, however, will no longer be centered on the star because of the angular rotation of the lens 104 and digital imaging system 100. The plane of focus for the lens 104 will instead be centered along line 'B1' of FIG. 1, behind the star, because of the locked lens focus, instead of along 'A1' where the user desires. With a sufficiently small DOF resulting from the digital imaging system 100 configuration and subject distance, the star may then become out of focus when the user takes the photograph after recomposing. As described previously, the DOF may vary depending on imaging sensor size, imaging lens focal length, exposure aperture, and subject distance. The autofocus error may be exacerbated when the DOF is small, such as when the subject distance is relatively short or the exposure aperture is relatively large.

Using the system of the disclosed system, the autofocus performance of digital imaging system 100 in certain situations may be improved by correcting for the error caused by rotation (i.e., change in attitude) of the digital imaging system 100 after focus lock. As will be described in more detail subsequently, the attitude sensor 108 may determine the attitude of the digital imaging system 100 both at the time of focus lock (digital imaging system 100 oriented along line 'A2') and when a photograph is taken (digital imaging system 100 oriented along line 'B2'). The difference between these two attitudes is the angle 'θ' depicted in FIG. 1. Using the calculated angle 'θ' and a measurement of the distance along line 'A2' when focus was locked (as described in more detail in relation to FIG. 4), the autofocus system 110 may calculate a focus correction distance and correct the focus before the exposure is taken. The focus correction distance may effectively be the distance between lines 'A1' and 'B1'. By correcting the focus in this matter, the digital imaging system 100 provides more accurate focus that is consistent with a user's intentions. The digital imaging system 100 may thus change the plane of focus from line 'B1' to line 'A1' so that the subject selected at focus lock (i.e., the star) is 'in focus' in the final exposure.

Figure 2:
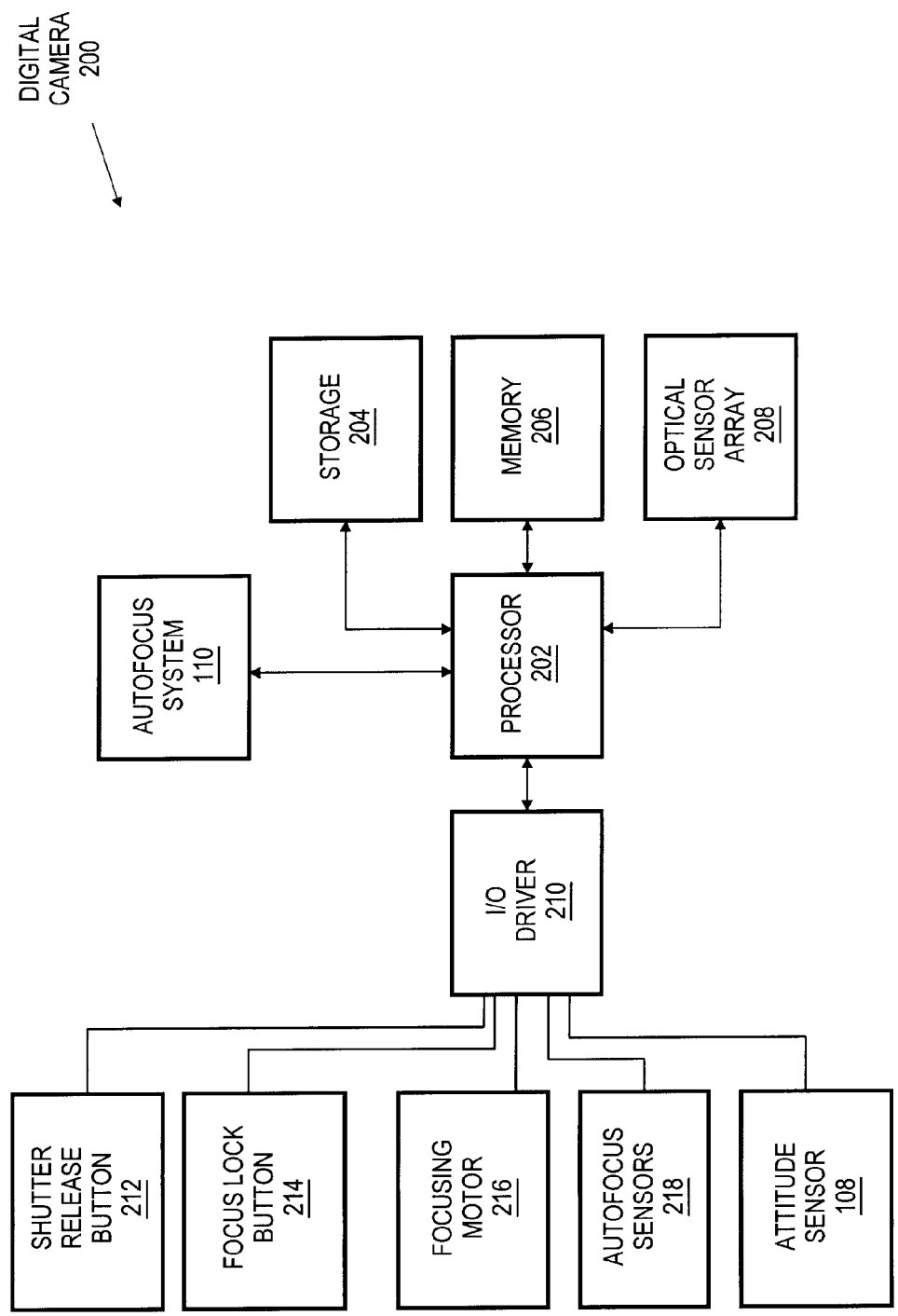
FIG. 2 depicts a block diagram of a digital camera suitable for use as the digital imaging system of FIG. 1 according to one embodiment.

FIG. 2 depicts a block diagram of a digital camera 200 suitable for use as the digital imaging system 100 of FIG. 1 according to one embodiment. The digital camera 200 of the depicted embodiment includes a processor 202 in connected to storage 204, memory 206, an optical sensor array 208, an I/O driver/controller 210, and an autofocus system 110. Processor 202 may include one or more system central processing units (CPUs) or processors to execute instructions. Storage 204 may include storage devices for storing digital images captured by the digital camera 200, such as removable media such as a microdrive or flash media devices such as a Secure Digital (SD)™ card (as defined by the SD Card Association), a CompactFlash® (CF) card, or a Memory Stick. Storage 204 may also include non-removable media such as hard drives or on-board non-volatile memory. Memory 206 may include read-only memory (ROM), random access memory (RAM), or other types of memory (or combinations thereof) containing a plurality of executable instructions which, when executed on processor 202, control the operation of the digital camera 200. The optical sensor array 208 may capture a digital image when exposed to light through lens 104 and store the image in storage 204.

The I/O driver/controller 210 may facilitate communications between processor 202 and other components of the digital camera 200, including user input devices and other hardware items. In the depicted embodiment, the digital camera 200 includes two input devices, the shutter release button 212 and the focus lock button 214. A user may actuate the shutter release button 212 to take a photograph (i.e., to request the digital camera 200 to expose the optical sensor array 208 to light for a specified timeframe). A user may actuate the optional focus lock button 214 whenever they wish to lock focus at its current position. By locking focus with the focus lock button 214, a user may then recompose without having the autofocus modify their desired point of focus. In other embodiments, the user may achieve focus lock (and/or exposure lock) by partially depressing the shutter release button 212, eliminating the need for the focus lock button 214. In these embodiments, fully depressing the shutter release button 212 will take an exposure. One skilled in the art will recognize that digital camera 200 may contain other user-actuated switches or buttons, such as playback buttons or manual focus rings 106.

The I/O driver/controller 210 may also facilitate communications between processor 202 and other hardware items, such as a focusing motor 216, autofocus sensors 218, and the attitude sensor 108. The focusing motor 216 may be an electromechanical or other type of motor that drives the lens forward or backward or causes other changes in the physical state of the lens to adjust the focus of the lens, such as by changing the distance between optical elements within the lens. The processor 202, based on commands from the autofocus system 110, may command the direction and speed of the focusing motor 216. The autofocus sensors 218 may be, for example, CCD sensors that look at the difference in intensity among the adjacent pixels to provide input to algorithms to compute the contrast of the actual image elements. The I/O driver/controller 210 may also facilitate communication with other hardware items, such as the lens 104, a shutter (if utilized), LCD display, external ports, mirrors, etc.

The autofocus system 110 may be in communication with the processor 202 to receive input from the user input devices and other hardware as well as to send commands to the hardware devices. The autofocus system 110 may, for example, receive input from the shutter release button 212 and focus lock button 214 in order to respond to user commands. The autofocus system 110 may also receive information from the autofocus sensors 218 and attitude sensor 108 that it uses to determine the proper focus. The autofocus system 110 may also receive status information (e.g., current location) from the focusing motor 216 and send commands to the focusing motor 216 to extend, retract, etc.

Figure 3:
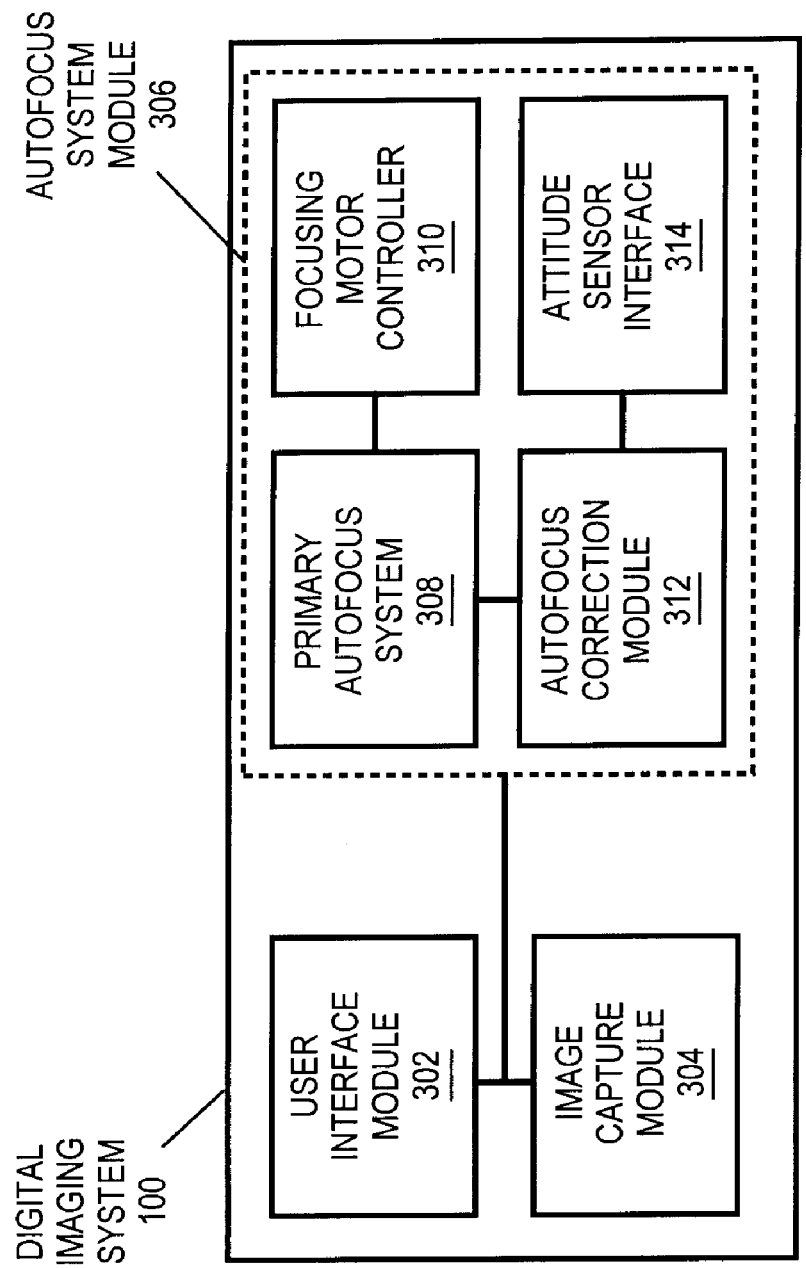
FIG. 3 depicts a conceptual illustration of software components of a digital imaging system such as a digital camera according to one embodiment.

FIG. 3 depicts a conceptual illustration of software components of a digital imaging system 100 such as a digital camera 200 according to one embodiment. The digital imaging system 100 of the depicted embodiment includes a user interface module 302, an image capture module 304, and an autofocus system module 306. The user interface module 302 may receive input from a user, such as actuations of a shutter release button 212 or focus lock button 214, as well as provide output to a user via an LCD display or other output device (e.g., audio device). The image capture module 304 may process the image recorded by the optical sensor array 208, including any noise reduction, sharpening, changes to color or saturation, changing image formats, saving the image to the storage 204, or any other task.

The autofocus system module 306 may control the autofocus system 110 and may include sub-modules such as a primary autofocus system 308, a focusing motor controller 310, an autofocus correction module 312, and an attitude sensor interface 314. The primary autofocus system 308 may receive inputs from the autofocus sensors 218 to determine whether or not the image underneath the autofocus sensors is in focus, as is known in the art. The primary autofocus system 308 may also produce commands to the focusing motor controller 310 for transmittal to the focusing motor 216. Feedback from the focusing motor 216 may also be received by the focusing motor controller 310 and utilized by the primary autofocus system 308. The autofocus correction module 312 may determine a focus correction factor based on attitude sensor 108 information received from the attitude sensor interface 314 and based on distance information determined by the primary autofocus system 308. As will be described in more detail in relation to FIG. 4, the autofocus correction module 312 may correct for focusing errors resulting in the rotation of a digital imaging system 100 after focus lock has been requested. The attitude sensor interface 314 may provide for interaction between the autofocus system module 306 and the attitude sensor 108 and may optionally perform processing on data received from the attitude sensor 108.

Figure 4:
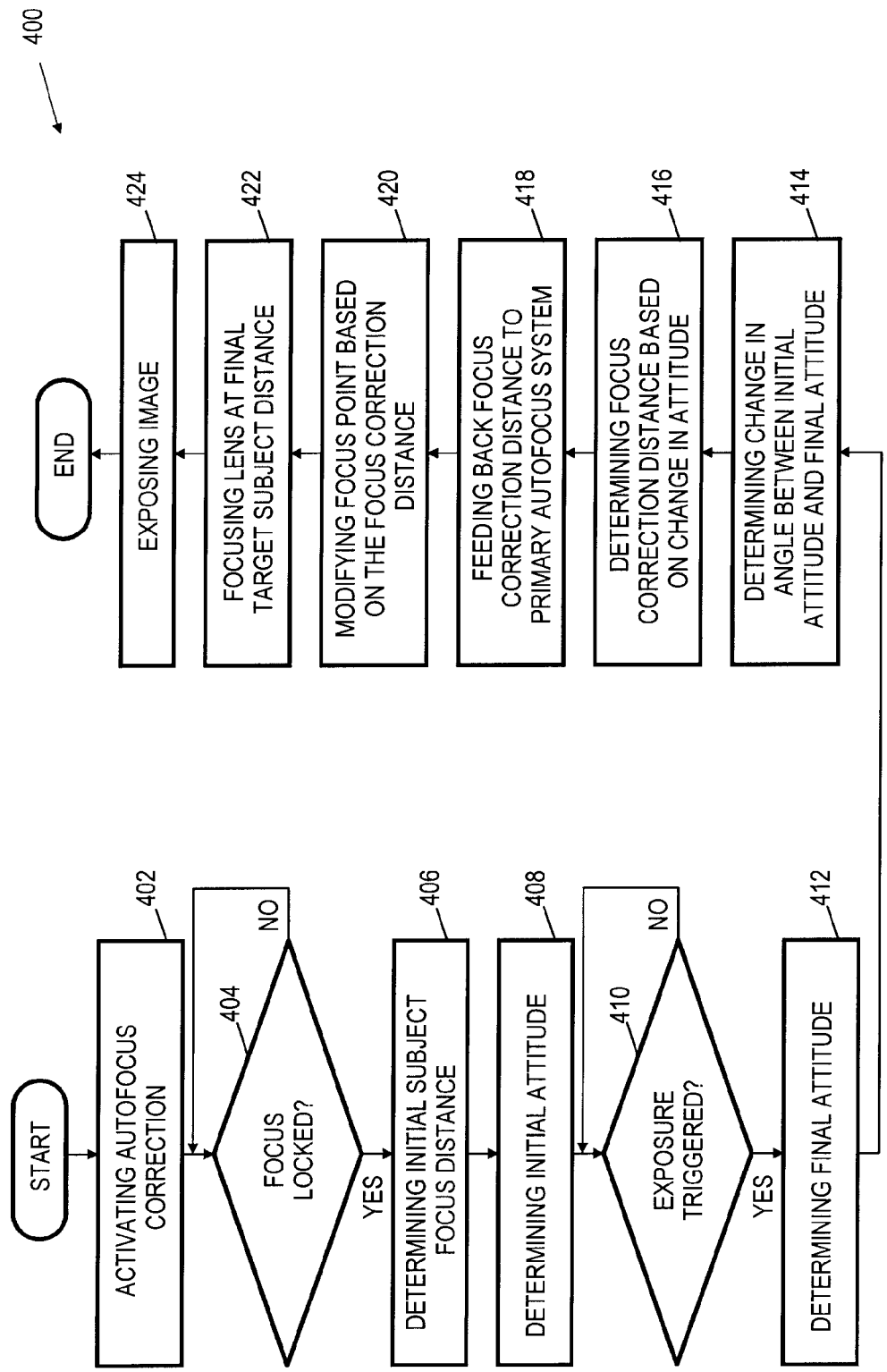
FIG. 4 depicts an example of a flow chart for correcting focus based on a change in attitude according to one embodiment.

FIG. 4 depicts an example of a flow chart 400 for correcting focus based on a change in attitude according to one embodiment. The method of flow chart 400 may be performed, in one embodiment, by components of a digital imaging system 100 and, in particular, the autofocus system module 306 and its sub-modules. Flow chart 400 begins with optional element 402, where the autofocus system module 306 activates autofocus correction according to embodiments of the present invention. In some embodiments, the autofocus system module 306 may activate autofocus correction in response to a request via a user who inputs the request via a button or entry in a control menu of a LCD display. In other embodiments, the autofocus system module 306 may activate the autofocus correction based on default settings or other means (e.g., autofocus correction automatically on). Once autofocus correction is initiated, the primary autofocus system 308 of the autofocus system module 306 may determine at decision block 404 when a user has locked the focus, such as by actuating the focus lock button 214 or partially depressing the shutter release button 212. Focus lock may be requested after use of the digital imaging system, such as when a user utilizes the autofocus system 110 to focus on a desired subject. Once focus lock is detected, the method of flow chart 400 continues to element 406; otherwise, the method awaits a determination that focus has been locked.

Once focus has been locked, the primary autofocus system 308 may determine the initial subject focus distance at element 406. The initial subject focus distance is the distance between the digital imaging system 100 and the point the user selects to be the point of focus the user locks in, as represented by distance 'A2' in FIG. 1. The primary autofocus system 308 may determine the initial subject focus distance using any methodology, including as part of an active autofocus system (where distance measurement is part of the autofocus procedure) or based on a passive autofocus system (where distance may be measured or determined as part of the autofocus algorithm). Alternatively, primary autofocus system 308 may determine the initial subject focus distance another way, such as by receiving input from a different distance-determining device or by calculating the distance based on the lens 104 position when focused.

In addition to determining the initial subject focus distance once focus has been locked, the autofocus correction module 312 of the autofocus system module 306 may also determine an initial attitude at element 408. The initial attitude may be the attitude of digital imaging system 100 at the time when autofocus is selected. The initial attitude may, in one example, be the attitude of digital imaging system 100 when it is pointing along line 'A2' of FIG. 1. In one embodiment, the initial attitude may be measured in relation to the earth's gravimetric field, such as when measured by a MEMS-based attitude sensor 108. The reference frame of the initial attitude may be any frame assuming that it is substantially similar to the reference frame of the final attitude determined later, as the difference between the two attitudes is the relevant angle, not the particular values for each of the initial and final attitudes (as described subsequently) in relation to element 414.

At decision block 410, the autofocus correction module 312 may determine that an exposure has been triggered, such as by receiving an indication directly or indirectly from the actuation of a shutter release button 212 by a user. If no indication of an exposure is received, the method of flow chart 400 may wait for such indication. This may occur when the user is recomposing their image after locking focus. Once an indication of the exposure has occurred, the method of flow chart 400 continues to element 412, where the autofocus correction module 312 may determine a final attitude, similarly to the determination of element 408. The final attitude represents the attitude of digital imaging system 100 at the time when the exposure is triggered. The final attitude may, in one example, be the attitude of digital imaging system 100 when it is pointing along line 'B2' of FIG. 1. The autofocus correction module 312 may next determine the change in angle between the initial attitude and the final attitude at element 414. The change in angle (represented by angle 'θ' in FIG. 1) may represent the total angular rotation of the digital imaging system 100 in roll, pitch, and yaw (i.e., the change in attitude) between the time when focus lock was initiated and the exposure was initiated. In some embodiments, the change in angle may be the difference between the measured initial and final attitudes.

After the change in angle is determined, the method of flow chart 400 continues to element 416, where the autofocus correction module 312 may determine a focus correction distance based on the change in angle. In one embodiment, the focus correction distance may be calculated by the following equation:

$$fcd = (d*(1-\cos\theta))$$

where 'fcd' is the focus correction distance, 'd' is the initial subject focus distance, and 'θ' is the change in angle. One skilled in the art will understand that other methodologies are also possible to determine a focus correction distance based on the change in angle, such as by using table lookups or other methodologies. After determining the focus correction distance, the autofocus correction module 312 may feedback the focus correction distance to the primary autofocus system 308 at element 418. The primary autofocus system 308 may modify the focus point based on the determined focus correction distance at element 420, such as by modifying the initial target subject distance by the focus correction distance to generate a final target subject distance before an exposure is made. In one embodiment, the focus correction distance may be subtracted from the initial target subject distance to determine the final target subject distance. The primary autofocus system 308 may then at element 422 command the focusing motor controller 310 to move the focusing motor 216 the appropriate amount based on the final target subject distance. The digital imaging system 100 may then expose the digital image at element 424, after which the method of flow chart 400 terminates.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates systems and methods for improving autofocus in a digital imaging system. It is understood that the form of the invention shown and described in the detailed description and the drawings are to be taken merely as examples. It is intended that the following claims be interpreted broadly to embrace all the variations of the example embodiments disclosed.

What is claimed is:

1. A method for autofocusing a lens of a digital imaging system, the method comprising:
   in response to locking of lens focus on a subject image, determining an initial subject focus distance and an initial attitude;
   in response to a request for an exposure, determining a final attitude;
   determining a final target subject distance based on the initial subject focus distance and a focus correction distance, the focus correction distance being based on the difference between the initial attitude and the final attitude; and
   focusing the lens at the final target subject distance.

2. The method of claim 1, further comprising activating autofocus correction.

3. The method of claim 1, further comprising after focusing the lens at the final target subject distance, exposing an image.

4. The method of claim 1, wherein determining an initial attitude comprises determining an initial attitude with respect to the earth's gravimetric field.

5. The method of claim 1, wherein determining a final attitude comprises determining a final attitude with respect to the earth's gravimetric field.

6. The method of claim 1, wherein determining a final target subject distance comprises:
   determining a focus correction distance based on the initial subject focus distance and the difference between the initial attitude and the final attitude; and
   modifying the initial subject focus distance by subtracting the determined focus correction distance to determine a final target subject distance.

7. The method of claim 1, wherein focusing the lens at the final target subject distance comprises driving the lens a distance based on the focus correction distance.

* * * * *